US005264289A

United States Patent [19]

Kondo et al.

[11] Patent Number: 5,264,289

[45] Date of Patent: Nov. 23, 1993

[54] PRINTING OFFSET BLANKET AND RUBBER ROLL

[75] Inventors: Yasuhiko Kondo, Akashi; Seiji Tomono, Nishinomiya; Toshikazu Ogita, Miki; Toshio Kamada, Kakogawa; Tsuneo Masuda, Yamatotakada; Tetsuya Fuchikami, Nishinomiya, all of Japan

[73] Assignee: Sumitomo Ruber Industries, Ltd., Kobe, Japan

[21] Appl. No.: 801,569

[22] Filed: Dec. 2, 1991

[30] Foreign Application Priority Data

Dec. 4, 1990 [JP] Japan ................................ 2-400407
Sep. 2, 1991 [JP] Japan ................................ 3-221876

[51] Int. Cl.[5] ...................... B32B 13/12; B32B 27/30; B41N 10/04

[52] U.S. Cl. .................................. 428/451; 428/494; 428/522; 428/909; 101/401

[58] Field of Search ................ 428/909, 451, 522, 494

[56] References Cited

U.S. PATENT DOCUMENTS 4,422,895 12/1983 Shimura et al. .................... 428/909
4,751,127 6/1988 Pinkston et al. .................... 428/909
4,812,357 3/1989 O'Rell et al. ........................ 428/909

*Primary Examiner*—P. C. Sluby
*Attorney, Agent, or Firm*—Nikaido, Marmelstein, Murray & Oram

[57] ABSTRACT

The printing offset blanket in accordance with the present invention has a surface printing layer made of a mixture of silicone rubber and oil-resisting rubber. It is therefore possible to prepare ink layers having a uniform thickness and clear edges. Further, the present offset blanket can be improved in paper discharging properties and retention of paper powder, enabling the blanket to be suitably applied to high-speed printing, filter or display prints, or the like. The printing rubber roll of the present invention is made of a mixture of silicone rubber and oil-resisting rubber. Accordingly, the present rubber roll is excellent in stability with respect to ultraviolet-curing ink and can therefore be used for a long period of time.

3 Claims, 9 Drawing Sheets

PRINTING OFFSET BLANKET AND RUBBER ROLL

BACKGROUND OF THE INVENTION

The present invention relates to an offset blanket and rubber rolls used for offset printing.

In printed matter such as filter or display prints or the like in which ink layers printed on the surface of a transparent member are seen through transmitted light, thickness variations in the ink layers, if any, are represented in terms of difference in color shade. It is therefore required that the ink layers have a substantially even thickness.

In offset printing using an offset blanket, however, a major portion of the ink transferred from the printing block to the blanket surface is not transferred to the surface of the member to be printed on, but remains on the blanket surface. Accordingly, the ink layers on the surface of the member to be printed on disadvantageously present concavo-convex portions due to cohesive failure, causing the layer thicknesses to become considerably uneven. Further, the print edges cannot be clearly reproduced.

A normal printing offset blanket has a supporting layer which incorporates or does not incorporate a porous compressive layer, and a surface printing layer on the supporting layer. The surface printing layer is made of a highly oil-resisting rubber material, mainly an acrylonitrile-butadiene copolymer (hereinafter referred to as NBR).

However, when printing is conducted at a high speed with the use of such a normal offset blanket, an adhering force is produced between the paper and the blanket. This may cause the paper to be curled or broken. Similar problems are encountered at the time of printing on a smooth member such as coated paper or the like. These problems are generally encountered when so-called paper discharging properties (paper releasing properties) are poor. Since such troubles greatly lower the productivity, the blanket is required to present good paper discharging properties.

To improve the paper discharging properties of a conventional offset blanket, there have been proposed a variety of methods such as a method in which polishing the surface of the surface printing layer is so conducted as to make the polished surface coarse, a method in which starch incorporated in the surface printing layer is first vulcanized and then extracted by being dissolved in a solvent (Japanese Patent Publication No. 238/1991), a method in which ultraviolet rays are irradiated onto the surface of the surface printing layer (Japanese Patent Unexamined Application No. 37706/1976), a method of surface chlorination (Japanese Patent Publication No. 51729/1972) and the like.

However, according to the method of making the surface roughness coarse or forming small holes in the surface, the contact area of the printing layer with paper is reduced to deteriorate the net-point shape, thus reducing the reproducibility of the net points. According to the method of surface chlorination, micro-cracks are produced in the surface of the surface printing layer, resulting in deterioration of net-point reproducibility, washing quality and the like. The method of surface treatment with ultraviolet rays is effective in improvements in paper discharging properties and is excellent in net-point reproducibility. However, this method requires not only an ultraviolet irradiation installation but also strict control of irradiation dose.

In addition to paper releasing properties, attention should be given to the problem of paper powder accumulated on the offset blanket due to long-term printing. More specifically, regenerated paper is increasingly used with the trend of resource conservation and recycling. However, the regenerated paper, which is deteriorated in quality, is liable to produce paper powder. Accumulation of paper powder on the off-set blanket provokes problems of decrease in printing quality, increase in the number of washing steps, and the like. To lessen the generation of paper powder, it is effective to make the surface roughness of the surface printing layer coarse as was done for improvement in paper discharging properties. It is however difficult to reduce the retention of paper powder without injuring the net-point reproducibility.

On the other hand, recent offset printing is liable to use ultraviolet-curing ink (UV ink) in order to prevent the working environment from being polluted by solvent components evaporated from ink, as well as for more efficient printing at a higher speed. With the diversification of a member to be printed on (particularly, plastics), the demand for the ultraviolet-curing ink is increased, particularly in the field of food packing, which should be kept free from printing smell.

In a commercially available offset printing machine, as shown in FIG. 13, ink transfer rolls 5*a*, ink kneading rolls 5*b* and ink applying rolls 5*c* are disposed from an ink reservoir 6 to a printing cylinder 7 for kneadingly supplying ink 8 to the printing cylinder 7. In view of the strength and affinity with oil ink, such rubber rolls 5*a*, 5*b*, 5*c* are generally made of a material mainly, that is at least more than about half, made of oil-resisting rubber such as NBR, urethane rubber or the like, or plastic such as polyvinyl chloride or the like. However, when ultraviolet-curing ink is used in an offset printing machine using such oil-resisting rubber, the rolls are disadvantageously swollen or decreased in outer diameter due to elution of additives, such as plasticizer or the like, contained in the rubber rolls. As a result, the rubber rolls cannot be used for a long period of time, requiring frequent replacement.

SUMMARY OF THE INVENTION

It is a main object of the present invention to provide an offset blanket suitable for printing printed matter such as filter or display prints, which is capable of forming, on the surface of a member to be printed on, ink layers which have a substantially even thickness and the edges of which are clear.

It is another object of the present invention to provide a printing offset blanket which is improved in paper discharging properties and retention of paper powder without the net-point reproducibility thereof being injured.

It is a further object of the present invention to provide a printing rubber roll which is excellent in stability with respect to ultraviolet-curing ink and which can be used for a long period of time.

To achieve the objects above-mentioned, the inventors studied hard the rubber material forming the surface printing layer of an offset blanket.

The inventors presumed that the use of silicone rubber which was hardly wetted with ink, reduced the amount of ink remaining on the blanket surface at the time of printing, thus solving the problems above-mentioned.

However, when the surface printing layer was made of the silicone rubber alone, the transferability of ink (ink applicability) from the printing block to the blanket is extremely deteriorated. This rather provoked the problems of concavo-convex portions, unclear edges and the like mentioned earlier. In the worst case, the prints became blurred. Further, since silicone rubber has poor oil resistance, it is subject to absorbing ink and being swollen by the absorbed ink, or by a solvent which is used to wash away ink. Such swelling deteriorates the printing payer made of the silicone rubber, which in turn causes the prints to be distorted.

In view of the foregoing, the inventors have further studied and found that, by the combination of the silicone rubber and rubber excellent in oil resistance, there could be obtained a surface printing layer excellent in the transferability of ink from the blanket to the surface of a member to be printed thereon, in transferability of ink from the printing block to the blanket and in oil resistance.

Further, the inventors have also found a novel fact that, by mixing silicone rubber and oil-resisting rubber to be used as the material of a surface printing layer, the surface printing layer has been remarkably improved in paper discharging (release) properties and retention of paper powder without deterioration of oil resistance of the surface printing layer, deterioration of printing quality such as net-point shape, ink applicability and the like, and increase in the number of printing steps or the like. Based on the findings above-mentioned, the present invention has been now accomplished.

More specifically, the offset blanket according to the present invention comprises a supporting layer and a surface printing layer disposed thereon and made of a mixture of a silicone rubber and an oil-resisting rubber.

On the other hand, the inventors have also studied hard a rubber material excellent in stability with respect to ultraviolet-curing ink, and found that silicone rubber has been excellent in durability with respect to ultraviolet-curing ink. However, the silicone rubber as a low strength and a small affinity for ink. Accordingly, rubber rolls made of silicone rubber cannot sufficiently achieve their objects such as ink kneading, ink transfer and the like. More specifically, in an offset printing machine, a number of rubber rolls are disposed between the ink reservoir and the printing cylinder, and ink is passed through gaps among the rolls so that the ink is kneaded to form an even ink film. When there is used a rubber material poor in rubber strength, such as tensile strength or the like, the between-roll gaps cannot be sufficiently reduced, causing the ink not to be sufficiently kneaded. The poor ink transferability causes trouble in the transfer of ink from rubber rolls to the surface of the printing cylinder. In any case, the silicone rubber is disadvantageous in view of lowered printing quality such as printing blur or the like.

Further, the silicone rubber is poor in oil resistance and is therefore liable to be readily deteriorated and swollen by normal oil ink or a solvent used for washingly removing the ink. Accordingly, when rolls made of silicone rubber are used with normal oil ink, printed characters or images may be distorted.

On the other hand, normal oil-resisting rubber, such as NBR, is poor in durability with respect to ultraviolet-curing ink, but is excellent in strength and presents good ink kneading and ink transfer which are objects to be achieved by rubber rolls.

The inventors have further studied and found that rubber rolls made of a mixture of silicone rubber and oil-resisting rubber have excellent durability with respect to ultraviolet-curing ink, as well as in rubber strength and ink transferability.

Further, even though used with normal oil ink, rubber rolls made of a mixture of oil-resisting rubber and silicone rubber are prevented from being deteriorated or swollen by oil ink or a solvent used for washingly removing the ink.

According to the present invention, the rubber rolls refer to ink rolls such as ink transfer rolls 5*a*, ink kneading rolls 5*b*, ink applying rolls 5*c* or the like as shown in FIG. 13, except for the offset blanket.

DETAILED DESCRIPTION OF THE INVENTION

Figure 1:
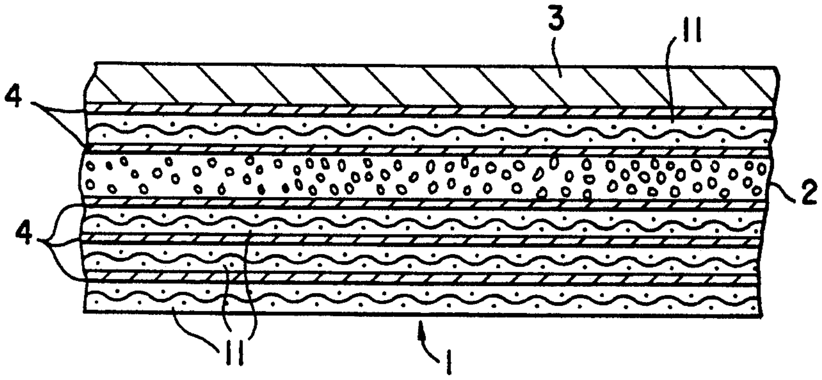
FIGS. 1 to 3 are schematic section views of examples of the lamination structure of an offset blanket in accordance with the present invention.

As silicone rubber to be used for the offset blanket and rubber rolls of the present invention, there may be suitably used, out of a variety of conventional silicone rubbers, millable-type silicone rubber which can be handled in the same manner as for normal rubber. The millable-type silicone rubber is supplied as a rubber compound mainly made of straight-chain polyorganosiloxane (silicone rubber) having a high polymerization degree (6,000 to 10,000) to which there are blended a silica-type reinforcing filler, an extender filler, a dispersion accelerator and the like. As the silicone rubber, the most prevailing one is methylvinyl silicone $[(CH_2=CH)(CH_3SiO]$, but there may also be used polyorganosiloxane in which a polymeric unit such as $(CH_3)_2SiO$, $(CF_3CH_2CH_2)SiO$, $(C_6H_5)_2SiO$ or the like is being introduced in the straight chain.

Examples of the oil-resisting rubber include acrylic rubber and NBR. There are commercially available a variety of NBRs having different grades dependent on the molecular weight and proportion of acrylonitrile. For an offset blanket, it is preferable to use NBR in which the amount of acrylonitrile is in a range from about 30 to about 40% in view of compatibility of oil resistance and ink transferability. For rubber rolls, it is preferable to use NBR in which the amount of acrylonitrile is not less than 30%, preferably from about 40 to about 50%, in view of compatibility of oil resistance and ink transferability.

In the offset blanket, the blending proportion by weight of silicone rubber/oil-resisting rubber is preferably in a range from 2/98 to 80/20. In such a range, the offset blanket is excellent not only in paper discharging properties, but also in retention of paper powder and ink transferability. More specifically, if the proportion of silicone rubber exceeds 80% by weight, the transfer of ink from the printing block is not good, causing the ink amount to be insufficient. This involves the likelihood of the generation of concavo-convex portions and unclear edges mentioned earlier, blurred prints and the like. Further, such an offset blanket is lowered in oil resistance so that the surface printing layer is liable to be deteriorated and swollen by ink during printing operation, or by a solvent. On the other hand, if the proportion of silicone rubber is below 2% by weight, such addition of silicone rubber is meaningless to deteriorate the paper discharging properties.

If the proportion of silicone rubber is extremely high, the paper discharging properties and retention of paper powder are improved, but the ink applicability and the oil resistance are apt to be lowered. Accordingly, when particularly desired to improve the paper discharging properties and the retention of paper powder, it is preferred to increase the proportion of silicone rubber (generally, not less than 10% by weight for the total amount of rubber raw materials). On the other hand, if the proportion of silicone rubber is extremely small, the paper discharging properties and the retention of paper powder are apt to be lowered. Accordingly, when particularly desired to improve the ink transferability and the oil resistance in the application where great importance is not placed on the paper discharging properties and the like, it is preferred to lessen the proportion of silicone rubber (generally, not more than 60% by weight for the total amount of rubber raw materials).

Accordingly, in view of balanced relationship among the ink transferability from the block to the blanket, the paper discharging properties and the retention of paper powder, the blending proportion of silicone rubber/oil-resisting rubber is preferably in a range from 10/90 to 60/40.

On the other hand, the blending proportion by weight of silicone rubber/oil-resisting rubber in a printing rubber roll is preferably in a range from 20/80 to 60/40. In such a range, the resulting rubber roll is excellent in durability with respect to ultraviolet-curing ink and improved in rubber strength and ink transferability. If the proportion of silicone rubber exceeds 60% by weight, the durability with respect to ultraviolet-curing ink is improved, but the rubber strength is lowered to lower ink kneading and ink transferability, and the oil resistance is also lowered, causing the resulting rubber roll to be readily swollen by oil ink. If the proportion of silicone rubber is below 20% by weight, the durability with respect to ultraviolet-curing ink is lowered. Thus, the use of ultraviolet-curing ink provokes swelling of the rubber roll, elution of additives or the like.

According to the present invention, the surface printing layer of the offset blanket may be manufactured by forming, in the form of a surface printing layer, a rubber compound prepared by mixing silicone rubber and oil-resisting rubber with a variety of additives such as a vulcanizer, vulcanizing accelerator, vulcanizing supplement accelerator, filler, plasticizer and the like, and by vulcanizing the resulting mixture in a conventional manner. The rubber roll of the present invention may be manufactured in a manner similar to that above-mentioned.

Examples of the vulcanizer contained in the rubber compound include sulfur, organic sulfur-containing compounds such as tetramethyl thiuram disulfide (TMTD), N,N'-dithiobis morpholine. As the vulcanizer, there may also be used a crosslinking agent of the organic peroxide type. Examples of the crosslinking agent of the organic peroxide type include tert-butylhydroperoxide, di-tert-butyl peroxide, dicumyl peroxide, tert-butylcumyl peroxide, 1,1-bis (tert-butyl peroxy) cyclododecane, 2,2-bis(tert-butyl peroxy) octane, 2,5-dimethyl-2,5 di(tert-butyl peroxy) hexane, 1,3-bis(tert-butyl peroxy isopropyl) benzene, n-butyl-4,4-bis(tert-butyl peroxy) vallerite, benzoyl peroxide, 2,4-dichlorobenzoyl peroxide, tert-butylperoxy benzoate and the like.

Examples of the vulcanizing accelerator include, as a main accelerator, thiazoles such as dibenzothiazyl disulfide(MBTS), N-oxydiethylene-2-benzothiazyl sulfenic amide (OBS), N-cyclohexyl-2-benzothiazyl sulfenic amide (CBS), N-tert-butyl-2-benzothiazyl sulfenic amide (TBBS) and the like. As necessary, there may be suitably used, as a secondary accelerator, 1,3-diphenyl guanidine (DPG), tetramethyl thiuram monosulfide (TMTM), zinc dimethyldithiocarbamate (ZnMDC), zinc ethylphenyldithio carbamate (ZnEPDC), tetramethyl thiuram disulfide (TMTD) which has been mentioned as the examples of the vulcanizer, and the like.

Examples of the filler include inorganic fillers such as calcium carbonate, hard clay, soft clay, water-containing silicic acid, silicic acid anhydride, barium sulfade, diatomaceous earch, talc, mica, asbestos, graphite, pumice and the like; and organic fillers such as regerated rubber, powdery rubber, asphalts, styrene resin, glue and the like.

FIG. 1 shows the arrangement of a compressive offset blanket having a supporting layer 1 containing a compressive layer 2 made of a synthetic resin foamed body or the like, and a surface printing layer 3 formed on the surface of the supporting layer 1.

Figure 2:
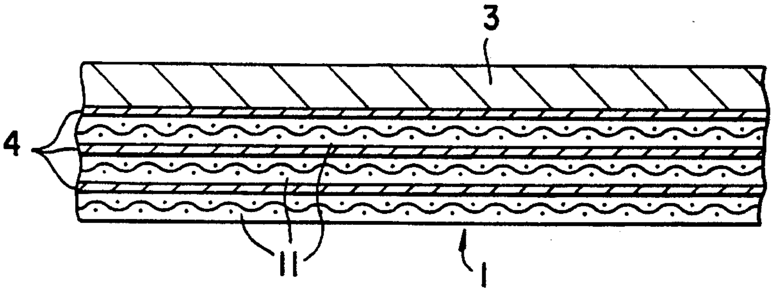

FIG. 2 shows the arrangement of a normal offset blanket having a supporting layer 1 and a surface printing layer 3 laminated directly on the supporting layer 1.

In each of the offset blankets in FIGS. 1 and 2, the supporting layer 1 is formed by laminating a plurality of layers of supporting bases 11 (three layers in FIGS. 1 and 2) through primer layers (adhesive layers) 4, and the surface printing layer 3 is formed on the supporting layer 1 through a primer layer 4. The thickness of the surface printing layer 3 is not limited to a specific value, but is preferably not greater than 350 μm.

In the offset blanket in FIG. 1, primer layers 4 are also disposed between the surface printing layer 3 and the compressive layer 2 in order to prevent the surface printing layer 3 from being positionally shifted by the application of pressure at the time of printing, provoking defective prints such as positional shift in net point, misregister and the like.

Figure 3:
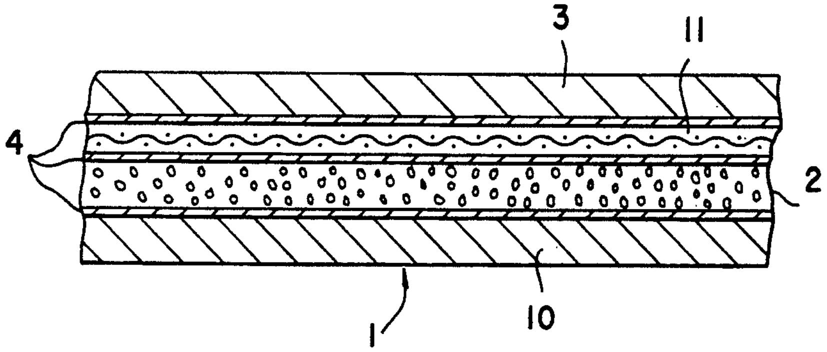

As the supporting base 11, a woven fabric of cotton, Rayon or the like is normally used but, as shown in FIG. 3, a sheet body 10 of a plastic film such as a polyester film, polypropylene film or the like, an aluminum foil or sheet, or the like, may be used instead of a plurality of supporting bases 11. FIG. 3 shows the arrangement of offset blanket in which, in the layer arrangement in FIG. 1, three supporting bases 11 below the compressive layer 2 are replaced with one sheet body 10. However, it is also possible that, in the layer arrangement in FIG. 2, three supporting bases 11 are replaced with one sheet body 10. In this case, it is preferable to form a surface printing layer 3 on the sheet body 10 through a primer layer 4, likewise in the arrangement in FIG. 2. According to the present invention, the offset blanket is not limited to any of the arrangements shown in FIGS. 1 to 3, but may have any of a variety of lamination arrangements.

In the offset blanket of the present invention, the surface printing layer is made of a mixture of silicone rubber of which surface tension is small and which is hardly wetted with ink, and oil-resisting rubber excellent in oil resistance. This provides excellent transferability of ink from the blanket to a member to be printed thereon, as well as good ink transferability from the printing block to the blanket. Also, the surface printing layer is excellent in oil resistance. Further, the offset blanket of the present invention is advantageously improved in paper discharging properties and retention of paper powder. Thus, the offset blanket of the present invention is suitably used for printing on a transparent member such as filter or display printing, as well as for high-speed printing.

The printing rubber rolls of the present invention are used as ink rolls for transferring ink from an ink reservoir to a printing cylinder in offset printing. Particularly, the present rubber rolls are suitable for offset printing using ultraviolet-curing ink, but it is a matter of course that the present rubber rolls may also be used for offset printing using normal oil ink.

As mentioned earlier, the rubber rolls of the present invention are made of a mixture of silicone rubber excellent in durability with respect to ultraviolet-curing ink and oil-resisting rubber excellent in rubber strength and ink transferability. Accordingly, even though used in printing using ultraviolet-curing ink, the present rubber rolls can be used for a long period of time while assuring high printing quality.

EXAMPLES

The following description will discuss in more detail the present invention with reference to Examples thereof and Comparative Examples, but it is a matter of course that the present invention should not be limited to such Examples.

EXAMPLE I

Offset Blanket

Study of Blending Proportion of Rubber Materials

Figure 4:
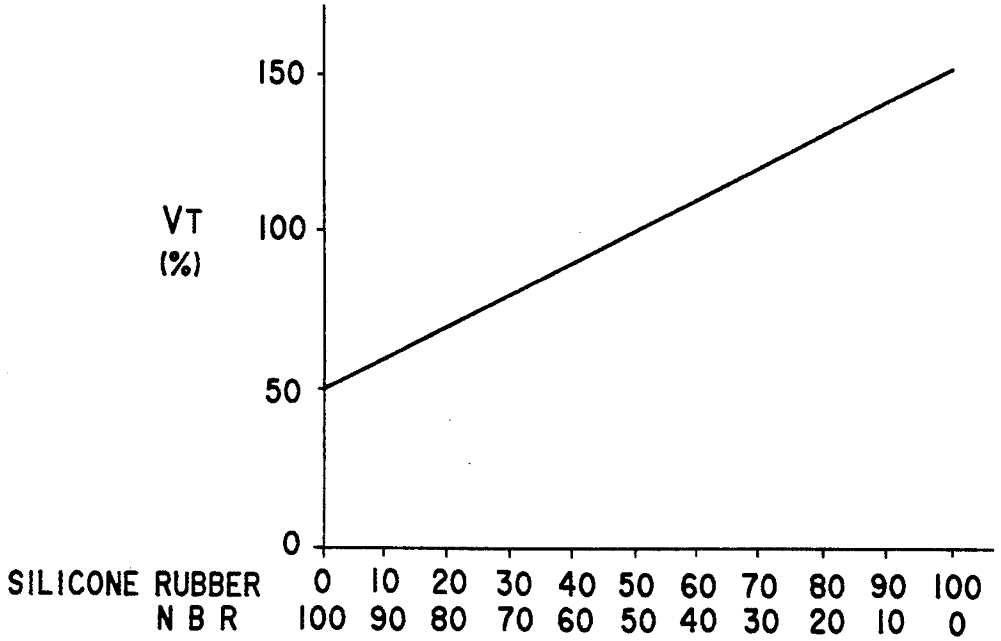
FIG. 4 is a graph illustrating the relationship between blending proportion of silicone rubber/NBR and oil resistance in an offset blanket.
Figure 5:
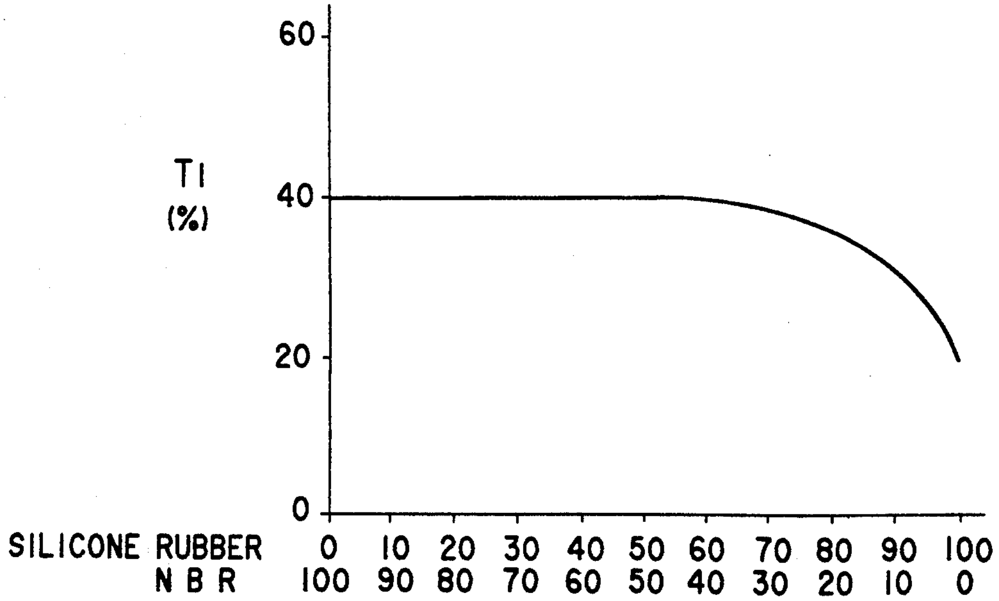
FIG. 5 is a graph illustrating the relationship between blending proportion of silicone rubber/NBR and printing characteristics in an offset blanket.
Figure 6:
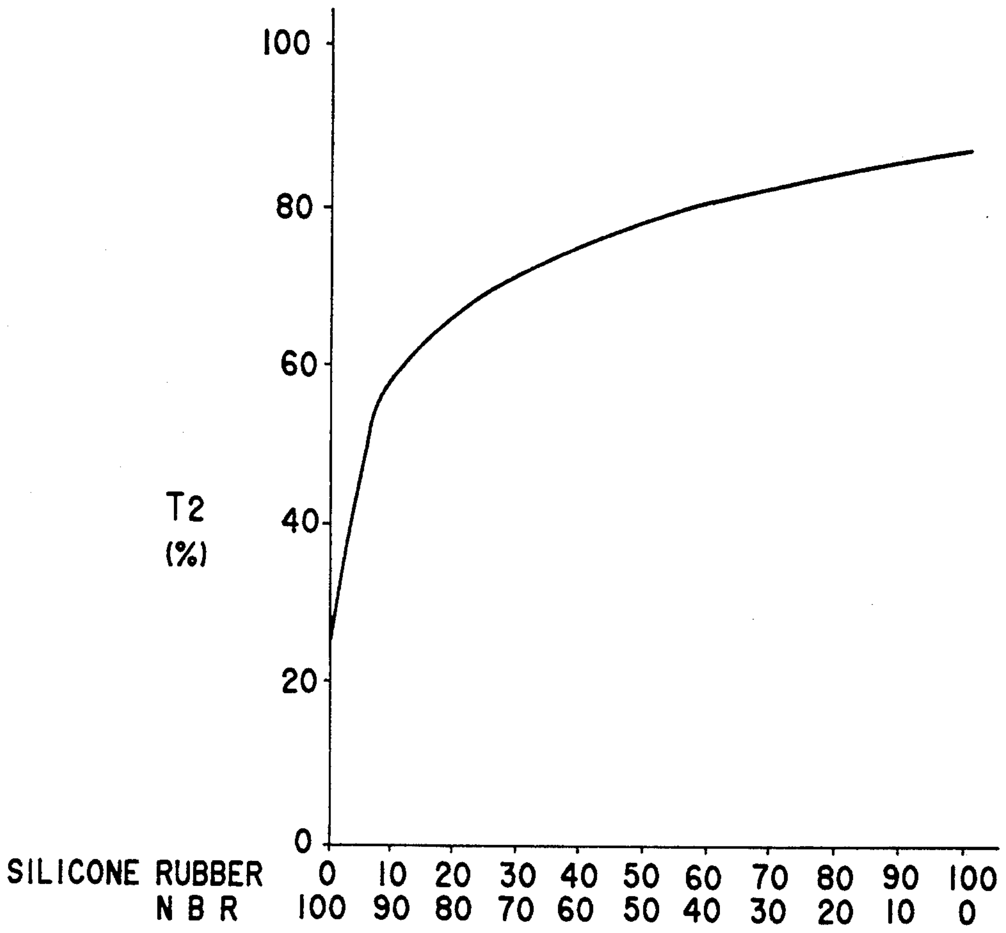
FIG. 6 is a graph illustrating the relationship between blending proportion of silicone rubber/NBR and printing characteristics in an offset blanket.

Nine different material rubbers were prepared by blending, in nine proportions from 10/90 to 90/10 as shown in FIGS. 4 to 6, millable-type silicone rubber (KE8751-U manufactured by Shinetsu Kagaku Company) and NBR (KRYNAC 803 manufactured by Polyser Company) as oil-resisting rubber. There were prepared nine different compound rubbers by blending 100 parts by weight of each of the material rubbers thus prepared, 30 parts by weight of a white filler, 30 parts by weight of dioctylphthalate, 5 parts by weight of zinc oxide, 0.5 part by weight of stearic acid, 1.5 part by weight of AccTT and 2.5 parts by weight of AccMOR.

As Comparative Examples, there were prepared, in the same manner as above-mentioned, compound rubbers by respectively using, as the material rubber, 100 parts by weight of silicone rubber alone and 100 parts by weight of NBR alone, as the raw material rubber.

Test of Oil Resistance

Each of the compound rubbers above-mentioned were molded and vulcanized to prepare a block of 1 mm×2 cm×2 cm. Each of the blocks was immersed in toluene maintained at 40° C. After 24 hours, the volume of each block was measured. Based on the volume $V_{T1}$ before immersion and the volume $V_{T2}$ after immersion, the volume increase rate $V_T$ (%) due to swelling was calculated according to the following equation. The results are shown in FIG. 4.

$$V_T = \frac{V_{T2} - V_{T1}}{V_{T1}} \times 100$$

From the results in FIG. 4, it is found that the smaller the proporiton of silicone rubber is, the greater the oil resistance.

Measurement of Ink Transferability

As shown in FIG. 1, each of the compound rubbers above-mentioned was laminated, through a primer layer 4 of rubber-type adhesive, on the surface of a supporting layer 1 in which four supporting bases 11 of cotton and a compressive layer 2 of foamed polyurethane were laminated through primer layers 4 of rubber-type adhesive. Each laminated body was vulcanized to prepare an offset blanket having a surface printing layer 3 with thickness of 350 μm.

With each offset blanket set to an ink transfer testing machine of Prüfbau Company, the ink transferability $T_1$ (%) from a printing block to each blanket and the ink transferability $T_2$ (%) from each blanket to coated paper were measured under the following conditions with the use of black ink (TOYO INK MARK V manufactured by Toyo Ink Company) and coated paper manufactured by Daio Seishi Company. FIG. 5 shows the results of the ink transferability $T_1$ (%) from the block to each blanket, while FIG. 6 shows the results of the ink transferability $T_2$ (%) from each blanket to coated paper.

Test Condition

Printing pressure: 600N
Printing speed: 2 to 4 m/s
Roll temp.: 25° C.

Fed ink amount: 0.522
Ambient temp.: 25° C.
Ambient humidity: 60%

From the results in FIG. 5, it is found that, in each of the blankets presenting a silicone rubber proportion of 2 to 60% by weight, the ink transferability $T_1$% from the block to the blanket is substantially equal to that of the blanket presenting a NBR porportion of 100% by weight. It is also found that, when the proportion of silicone rubber exceeds 60% by weight, the ink transferability $T_1$% is gradually lowered and that, when the proportion of silicone rubber exceeds 80% by weight, the ink transferability $T_1$% is suddenly lowered.

From the results in FIG. 6, it is found that, in each of the blankets presenting a silicone rubber proportion of not less than 2% by weight, particularly not less than 10% by weight, the ink transferability $T_2$% from the blanket to coated paper is remarkably high as compared with the blanket presenting a NBR proportion of 100% by weight.

Observation of Density Variations

As to the coated papers obtained in the measurement of ink transferability above-mentioned, the surfaces were visually checked for density variations of the ink layers. It was observed that the offset blankets respectively using silicone rubber alone and NBR alone presented remarkable variations of density, but the offset blankets jointly using silicone rubber and NBR presented no outstanding density variations in the ink layers. The offset blanket using silicone rubber alone was inferior in density variation, blur and the like to the offset blanket using NBR alone.

EXAMPLE 1

As shown in FIG. 3, the compound rubber presenting a silicone rubber/NBR proportion of 20/8 prepared in Study of Blending Proportion of Rubber Materials, was laminated, through a primer layer 4 of rubber-type adhesive, on the surface of a supporting layer 1 formed by laminating one supporting base of cotton 11, a compressive layer 2 of foamed polyurethane and a polyester film 10 in this order through primer layers 4 of rubber-type adhesive, the compound rubber being laminated on the supporting layer 1 at its surface at the side of the supporting base 11. The laminated body was vulcanized to prepare an offset blanket having a surface printing layer 3 with a thickness of 350 μm.

COMPARATIVE EXAMPLE 1

An offset blanket was prepared in the same manner as in Example 1, except for the use of the compound rubber presenting a silicone rubber proportion of 100% by weight prepared in Study of Blending Proportion of Rubber Materials.

COMPARATIVE EXAMPLE 2

An offset blanket was prepared in the same manner as in Example 1, except for the use of the compound rubber presenting a NBR proportion of 100% by weight prepared in Study of Blending Proportion of Rubber Materials.

Printing Test 1

With each of the offset blankets of Example 1 and Comparative Examples 1, 2 set to a glass plate printing machine (Ector-600 CL manufactured by Koyo Company), a stripe pattern having a line width of 20 μm and a line distance of 20 μm was printed on the surface of a glass plate with the use of an original block of 300 lines and ultraviolet-curing ink (manufactured by Dai-Nihon Ink Company) for glass. The section shapes of the ink layers forming the printed stripe pattern were measured with a non-contact type surface-shape measuring device (Surface Shape Analyzer SAS2010 manufactured by Meishin Koki Company).

The glass ink swelling $V_{UV}$% in the surface printing layer was 9% for Example 1, 17% for Comparative Example 1 and 25% for Comparative Example 2.

Figure 7A:
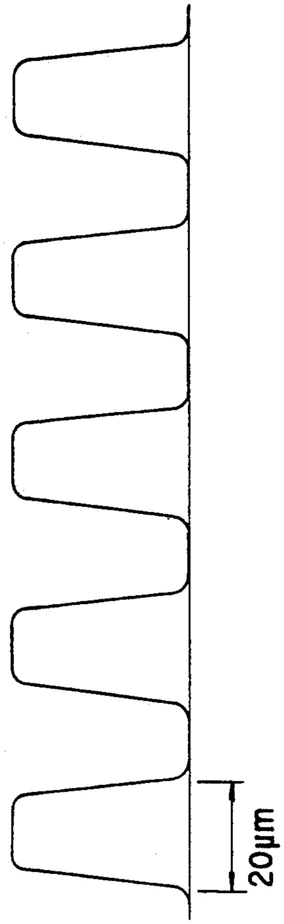
FIGS. 7(*a*), (*b*) and (*c*) are graphs respectively illustrating the sections of ink layers obtained in Printing Test 1 using offset blankets of Example 1 and Comparative Examples 1 and 2.
Figure 7B:
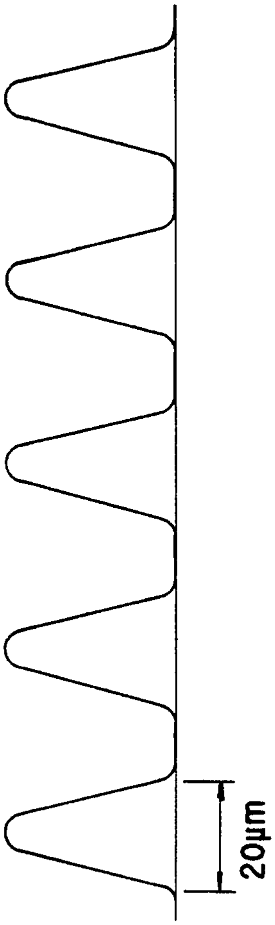
Figure 7C:
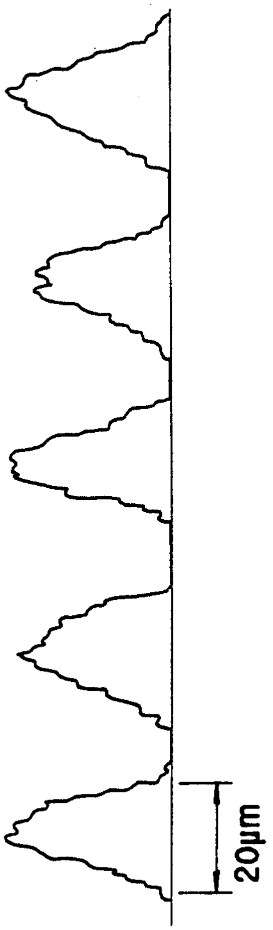

Results of the measurement of section shapes of the ink layers are shown in FIGS. 7(*a*) to (*c*), in which FIG. 7 (*a*) shows the section shapes of the ink layers obtained with the use of the offset blanket of Example 1, FIG. 7(*b*) shows the section shapes of the ink layers obtained with the use of the offset blanket of Comparative Example 1, and FIG. 7(*c*) shows the section shapes of the ink layers obtained with the use of the offset blanket of Comparative Example 2.

From the results shown in FIG. 7, it is found that, when the offset blanket of Comparative Example 2 having a surface printing layer of NBR alone was used, the ink layer sections presented concavo-convex portions and the ink layers presented a variety of section shapes and heights. Thus, it was found that the ink layers were partially projected and concaved due to cohesive failure. Further, the ink layers presented various shapes at both ends thereof. Thus, it was found that the edges of the ink layers were unclear.

When the offset blanket of Comparative Example 1 having a surface printing layer of silicone rubber alone was used, the ink layer sections presented no concavo-convex portions and the ink layers presented substantially equal section shapes and heights. However, the ink layers presented gentle slopes at both ends thereof. Thus, it was found that the edges of the ink layers were unclear.

When the offset blanket of Examples 1 having a surface printing layer of a mixture of silicone rubber and NBR, the ink layer sections presented no concavo-convex portions and the ink layers presented substantially equal section shapes and heights. Thus, it was found that the ink layers were neither protruded nor concaved due to cohesive failure. Each ink layer rises sharply at both ends thereof. Thus, it was found that the ink layers were clear at the edges thereof.

Printing Test 2

Figure 8A:
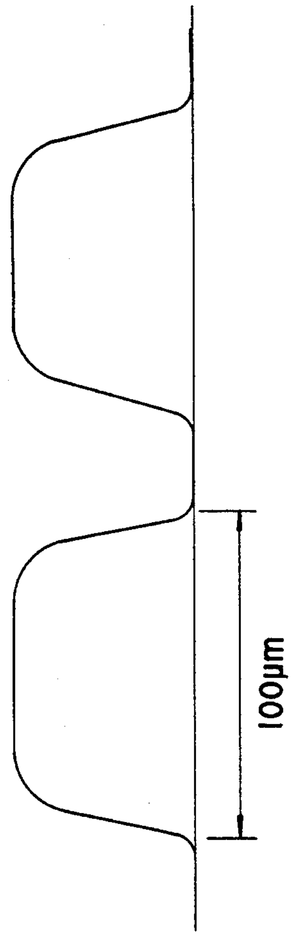
FIGS. 8(*a*), (*b*) and (*c*) are graphs respectively illustrating the sections of ink layers obtained in Printing Test 2 using offset blankets of Example 1 and Comparative Examples 1 and 2.
Figure 8B:
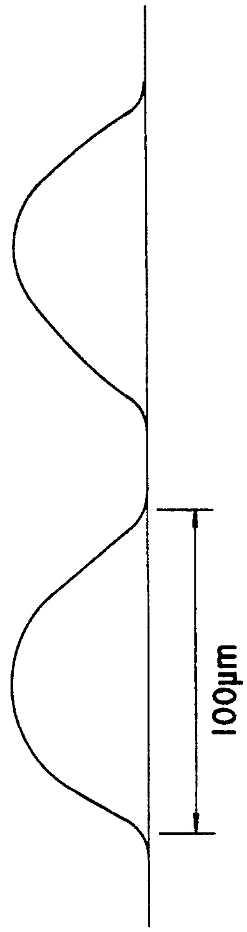
Figure 8C:
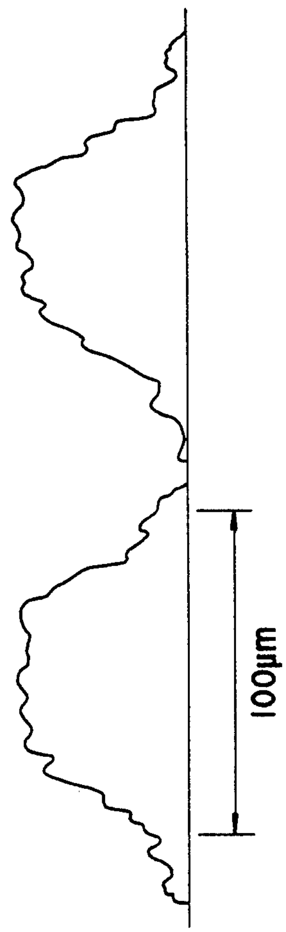

With the use of each of the blankets, a printing test was conducted in the same manner as in Printing Test 1, except that a stripe pattern having a line width of 100 μm and a line distance of 100 μm was printed on the surface of a glass plate. In this test, each ink layer was measured as to the section shape in a direction at a right angle to the stripe pattern. FIG. 8(*a*) shows the section shapes of the ink layers obtained with the use of the offset blanket of Example 1, FIG. 8(*b*) shows the section shapes of the ink layers obtained with the use of the offset blanket of Comparative Example 1, and FIG. 8(*c*) shows the section shapes of the ink layers obtained with the use of the offset blanket of Comparative Example 2.

From the results shown in FIG. 8, it is found that, when the offset blanket of Comparative Example 2 was used, the ink layer sections presented concavo-convex portions and the ink layers presented a variety of section shapes and heights. Thus, it was found that the ink layers were partially protruded and concaved due to cohesive failure. Further, both ends of each ink layer project as exceeding from a predetermined width. Thus, it was found that the edges of the ink layers were unclear.

When the offset blanket of Comparative Example 1 was used, the ink layers presented gentle slopes at both ends thereof. Thus, it was found that the edges of the ink layers were unclear. Further, the heights of the ink layers are lower than those of the respective ink layers obtained with the use of the offset blankets of Comparative Example 1 and Example 1 to be discussed later. Thus, it was found that, when the offset blanket of Comparative Example 1 was used, the ink transferability from the block to the blanket was not good, causing the ink amount to be insufficient.

It was also found that, when the offset blanket of Examples 1 was used, the ink layer sections presented no concavo-convex portions due to cohesive failure and the ink layers were clear at the edges thereof.

Printing Test 3

Figure 9A:
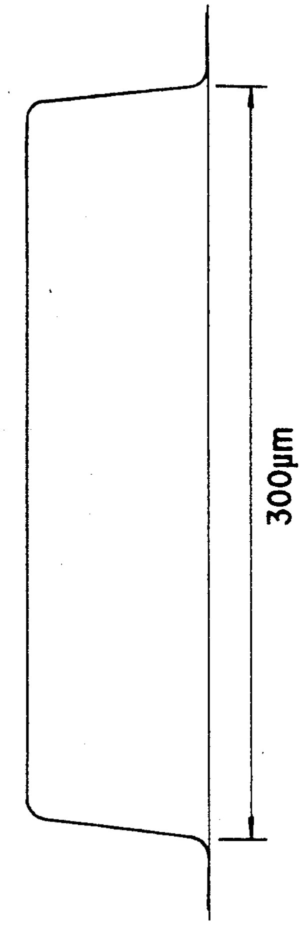
FIGS. 9(*a*), (*b*) and (*c*) are graphs respectively illustrating the sections of ink layers obtained in Printing Test 2 using offset blankets of Example 1 and Comparative Examples 1 and 2.
Figure 9B:
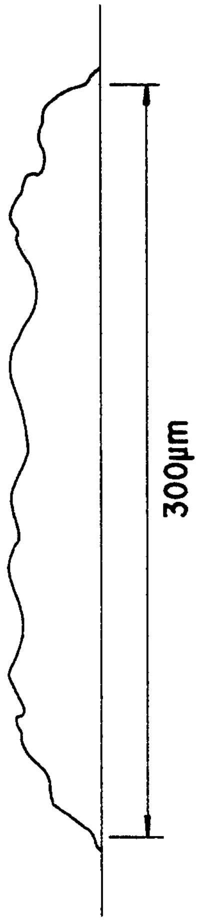
Figure 9C:
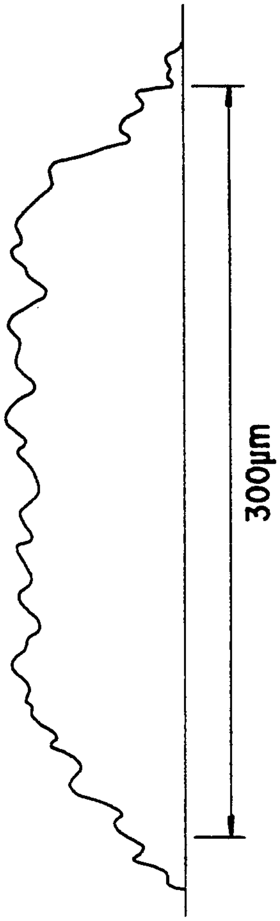

With each of the offset blankets of Example 1 and Comparative Examples 1, 2 set to the glass plate printing machine above-mentioned, a square dot having a length of 300 μm and a width of 250 μm was printed on the surface of a glass plate with the use of an original block of 300 lines and the ultraviolet-curing ink for glass above-mentioned. As to each ink layer forming the square dot, the section of the longer side thereof was measured with the non-contact type surface shape measuring device above-mentioned. FIG. 9(*a*) shows the section shape of the ink layer obtained with the use of the offset blanket of Example 1, FIG. 9(*b*) shows the section shape of the ink layer obtained with the use of the offset blanket of Comparative Example 1, and FIG. 9(*c*) shows the section shape of the ink layer obtained with the use of the offset blanket of Comparative Example 2.

From the results shown in FIG. 9, it was found that, when the offset blanket of Comparative Example 2 was used, the ink layer section presented concavo-convex portions. Thus, it was found that the ink layer was partially protruded and concaved due to cohesive failure. Further, both ends of the ink layer outwardly projected as exceeding from a predetermined width. Thus, it was found that the edges of the ink layer were unclear.

It was also found that, when the offset blanket of Comparative Example 1 was used, the ink layer section presented concavo-convex portions of which wavelengths were greater than those of the concavo-convex portions in Comparative Example 2. Further, it was found that the height of the ink layer was lower than that of each of the respective ink layers obtained with the use of the offset blankets of Comparative Example 1 and Example 1 to be discussed later. Thus, it was found that, when the offset blanket of Comparative Example 1 was used, the ink transferability from the block to the blanket was not good, causing the ink amount to be insufficient, so that the ink layer section presented concavo-convex portions due to cohesive failure. Further, it was found that the ink layer presented gentle slopes at both ends thereof, so that the edges of the ink layer were unclear.

It was found that, when the offset blanket of Examples 1 was used, the ink layer section presented no concavo-convex portions due to cohesive failure and the ink layer was clear at the edges thereof, likewise in Printing Tests 1 and 2.

EXAMPLES 2 TO 9 AND COMPARATIVE EXAMPLES 3, 4

Compound rubbers for a surface printing layer were prepared by mixing, in the respective proportions shown in Table 1, millable-type silicone rubber and oil-resisting rubber identical with those used in Study of Blending Proportion of Rubber Materials. More specifically, there were prepared compound rubbers for a surface printing layer by blending 100 parts by weight of each of the raw material rubbers thus prepared, 30 parts by weight of a white filler (Nipsil VN 30), 20 parts by weight of a plasticizer (dioctylphthalate), 1 part by weight of a crosslinking agent (dicumyl peroxide) and 0.3 part by weight of a cross-linking retarder (Sconock N manufactured by Ouchi Sinko Kagaku Company).

According to a conventional method, each of the surface printing layers was applied, through a primer, onto a supporting layer including four supporting bases of cotton and a compressive layer, and dried and vulcanized to prepare an offset blanket having a surface printing layer with a thickness of 0.3 mm.

Printing Test 4

A printing test was conducted under the following conditions with a printing machine (Type 560 manufactured by Ryobi Co., Ltd.) on which each of the offset blankets of Examples 2 to 9 and Comparative Example 3 and 4 was mounted.

P/B pressure: 15/100 mm

P/I pressure: 15/100 mm

Ink: MARK V NEW PROCESS EYE manufactured by Toyo Ink Co., Ltd.

Paper:

Fine paper; 70 kgs. (Manufactured by Daio Seishi Co., Ltd.)

Coated paper; 110 kgs. (")

Printing speed: 10,000 pcs./hour

Table 1 shows test results as measured in the following manner.

(1) Net-point Shape

The shape of each printed net-point was evaluated based on shape coefficient. The shape coefficient is represented by the following formula. As the shape coefficient is nearer to 1, the roundness of the net point is greater so that the net point is evaluated high. In the following formula, the area and peripheral length are obtained by image analysis.

$$\text{Shape Coefficient} = (\text{Peripheral Length})^2/(4\pi \times \text{Area})$$

(2) Uniformity of Ink Coating Amount at Solid Printing

By image analysis, the density distribution of each solid printing portion was examined and the standard deviation thereof was obtained. Based on the standard deviation, the uniformity of ink coating amount at solid printing was evaluated. The smaller the standard deviation is, the better the uniformity.

⊚: Standard deviation not more than 8

○: Standard deviation from 10 to 12

Δ: Standard deviation from 12 to 14

X: Standard deviation not less than 14

(3) Oil Resistance

In the same manner as mentioned earlier, a block of 1 mm×2 cm×2 cm was prepared from each of the compound rubbers above-mentioned. After each block was immersed in toluene at 40° C. for 24 hours, the volume increase rate $V_T$ as above-mentioned was calculated. The oil resistance was evaluated according to the following criteria:

⊚: $V_T$ is not greater than 120%.
○: $V_T$ is from 120% to 150%.
Δ: $V_T$ is from 150% to 175%.
X : $V_T$ is from 175% to 200%.
XX : $V_T$ is not less than 200%.

(4) Paper Discharging Properties

The curl height of ten pieces of coated paper after entirely printed in solid printing was measured. The higher the curl height is, the better the paper discharging properties.

(5) Retention of Paper Powder

After 10,000 pieces were printed, the surface of each offset blanket was visually checked for the amount of paper powder sticked thereto. The evaluation was made according to the following criteria:

○: Substantially no paper powder
Δ: Paper powder accumulated in the vicinity of the edges
X: Paper powder sticked on the entire surface
XX: Paper powder considerably sticked

TABLE 1

| | Comparative Example 3 | Example No. 2 | 3 | 4 | 5 | 6 | 7 | 8 | 9 | Comparative Example 4 |
|---|---|---|---|---|---|---|---|---|---|---|
| Proportion (by weight) | | | | | | | | | | |
| NBR | 100 | 98 | 95 | 90 | 80 | 70 | 60 | 40 | 20 | 0 |
| Silicone rubber | 0 | 2 | 5 | 10 | 20 | 30 | 40 | 60 | 80 | 100 |
| Net-point shape | 1.8 | 1.4 | 1.4 | 1.3 | 1.3 | 1.2 | 1.2 | 1.1 | 1.1 | 1.1 |
| Uniformity of ink coating amount at solid printing | Δ~○ | ○ | ○ | ⊚ | ⊚ | ○~⊚ | ○ | Δ | Δ | X |
| Oil resistance | ⊚ | ⊚ | ⊚ | ⊚ | ⊚~○ | ○ | ○ | Δ | Δ | XX |
| Paper discharging properties | 55 | 15 | 13 | 10 | 9 | 9 | 8 | 7 | 6 | 6 |
| Retention of paper powder | XX | Δ | Δ~○ | ○ | ○ | ○~⊚ | ○~⊚ | ⊚ | ⊚ | ⊚ |

As apparent from Table 1, it is found that, as the proportion of silicone rubber is increased from the proportion of 2% (Example 2), the retention of paper powder and paper discharging properties are greatly improved and the uniformity of ink coating amount at solid printing and net-point shape are also improved. It is also found that, when the proportion of silicone rubber exceeds 80% (Comparative Example 4), the oil resistance is extremely bad and the transferability of ink from the block to the blanket is deteriorated to decrease the amount of ink transferred to paper. This results in low ink density, so that the ink applicability is lowered. From the foregoing, it is found that the proportion of silicone rubber/NBR is preferably in a range from 2/98 to 80/20.

EXAMPLE II

Printing Rubber Roll

Study of Blending Proportion of Rubber Materials

Different raw material rubbers were prepared by blending, in different proportions, millable-type silicone rubber (KE8751-U manufactured by Shinetsu Kagaku Company) and NBR (KRYNAC 803 manufactured by Polyser Company). There were prepared different compound rubbers by blending 100 parts by weight of each of the material rubbers thus prepared, 30 parts by weight of a white filler, 30 parts by weight of dioctylphthalate, 5 parts by weight of zinc oxide, 0.5 part by weight of stearic acid, 1.5 part by weight of AccTT and 2.5 parts by weight of AccMOR.

Test of Ink Resistance

Each of the compound rubbers was molded and vulcanized to prepare a block of 1 mm×2 cm×2 cm. Each of the blocks was immersed in oil ink maintained at 40° C. After 24 hours, the volume of each block was measured. Based on the volume before immersion and the volume after immersion, the volume increase rate ΔV (%) due to swelling was calculated. For the test, process ink manufactured by Dai-Nihon Ink Co., Ltd. was used as the oil ink.

Each of blocks prepared in the same manner as above, was immersed in ultraviolet-curing ink maintained at 40° C. After 24 hours, the volume of each block was measured. In the same manner as above-mentioned, the volume increase rate ΔV (%) due to swelling was calculated. For the test, BEST CURE manufactured by Toka Shikiso Kagaku Co., Ltd. was used as the ultraviolet-curing ink.

Figure 10:
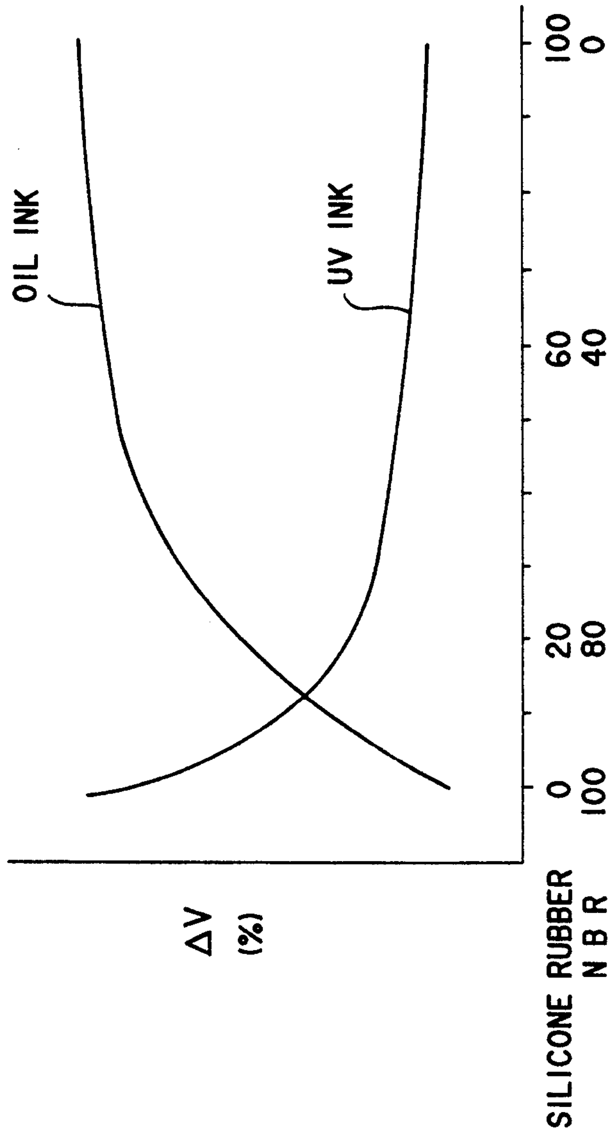
FIG. 10 is a graph illustrating the relationship between the blending proportion of silicone rubber/NBR and volume increase rate due to swelling in a printing rubber roll.

FIG. 10 shows the test results. From FIG. 10, it was found that, as the proportion of silicone rubber was smaller, the oil resistance was greater, and as the proportion of NBR was smaller, the durability with respect to the ultraviolet-curing ink was greater.

Test of Rubber Strength

Each of the compound rubbers was molded and vulcanized to prepare a specimen of JIS (Japanese Industrial Standards) dumbbell No. 3. The tensile strength of each specimen was measured under the conditions of JIS 6302.

Figure 11:
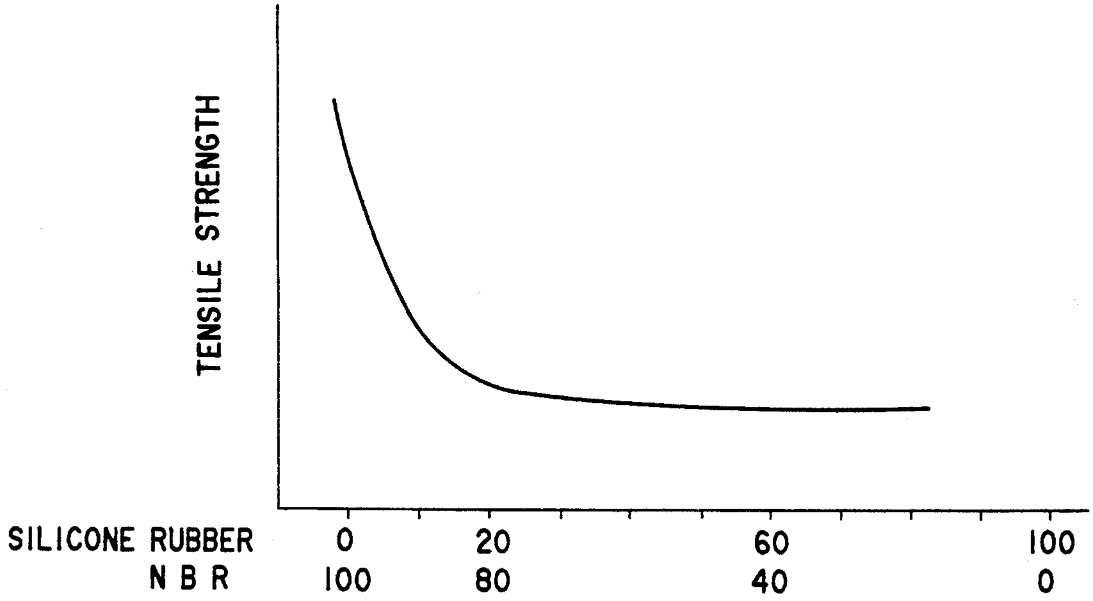
FIG. 11 is a graph illustrating the relationship between the blending proportion of silicone rubber/NBR and tensile strength in a printing rubber roll.

FIG. 11 shows the test results. From FIG. 11, it is found that, as the proportion of silicone rubber is increased, the strength is lowered.

EXAMPLE 10

A raw material rubber was prepared by blending millable-type silicone rubber (KE8751-U manufactured by Sinetsu Kagaku Company) and NBR (KRYNAC 803 manufactured by Polyser Company) as oil resistance rubber in a blending proportion of 20/80 by weight of silicone rubber/NBR. There was prepared compound rubber by blending 100 parts by weight of the material rubber thus prepared, 30 parts by weight of a white filler, 30 parts by weight of dioctylphthalate, 5 parts by weight of zinc oxide, 0.5 part by weight of stearic acid, 1.5 part by weight of AccTT and 2.5 parts by weight of AccMOR.

The compound rubber was molded, vulcanized and prepared as a rubber roll having a length of 200 mm and an outer diameter of 50 mm as put on a center shaft having a length of 500 mm and an outer diameter of 10 mm.

COMPARATIVE EXAMPLE 5

A rubber roll was prepared in the same manner as in Example 10, except for the use of NBR as raw material rubber.

Evaluation Test

Figure 12:
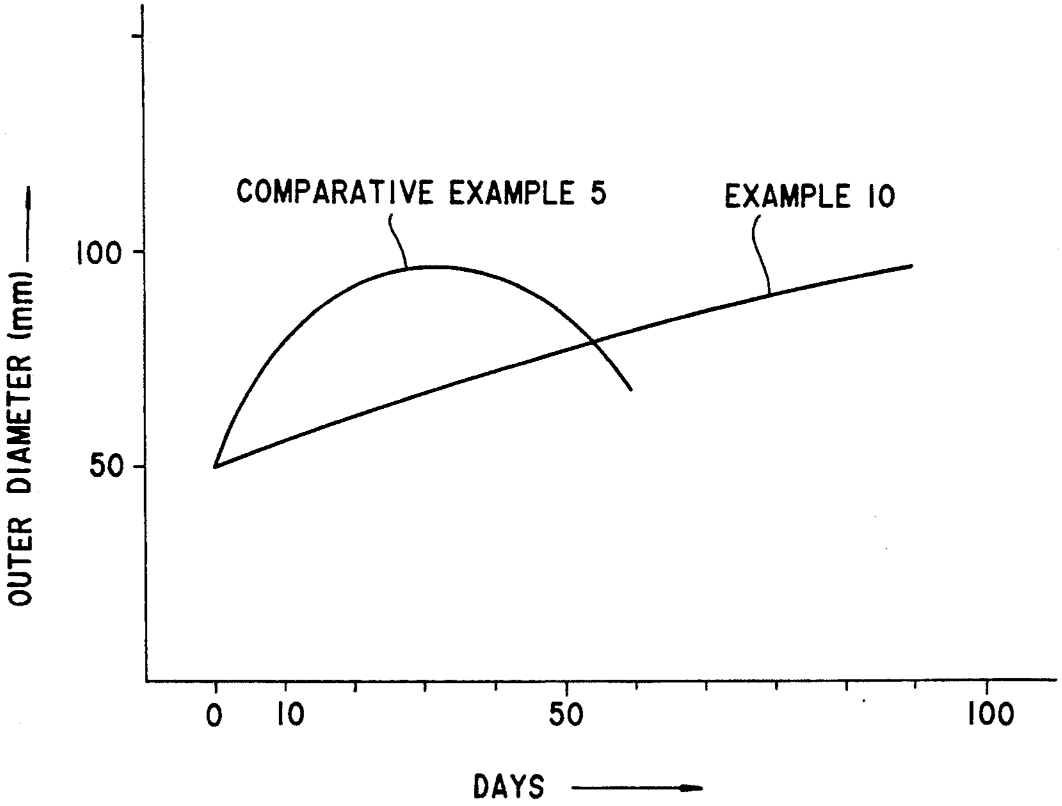
FIG. 12 is a graph illustrating changes, with the passage of time, in outer diameter of rubber rolls of Example 11 and Comparative Example 5.
Figure 13:
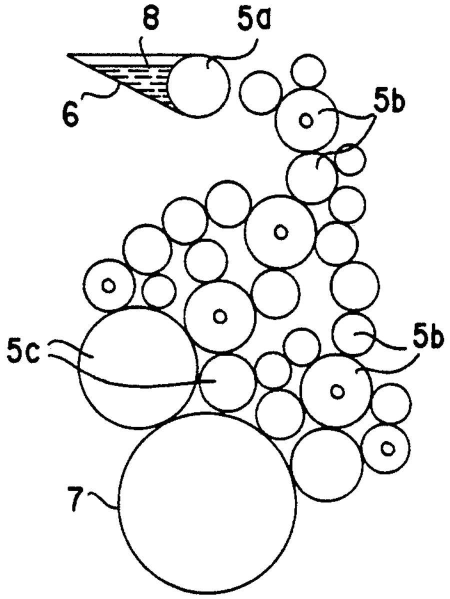
Fig.13 PRIOR ART
FIG. 13 is a schematic view illustrating the arrangement of rubber rolls disposed in a commercially available offset printing machine.

Each of the rubber rolls thus prepared was immersed in ultraviolet-curing ink containing an acrylic monomer (BEST CURE manufactured by Toka Shikiso Kagaku Co., Ltd.). With the ink maintained at 40° C., each of the rolls was checked for change in outer diameter with the passage of time. FIG. 12 shows the test results.

From FIG. 12, it was found that, after 30 days, the roll of Comparative Example 5 which was a conventional rubber roll, was swollen and increased in outer diameter to about 100 mm and, thereafter, a plasticizer was extracted, causing the roll to be decreased in outer diameter. On the other hand, the swelling speed of Example 10 was reduced to about ⅓ of that of Comparative Example 5. Accordingly, the life-time of the roll of Example 10 was lengthened about 3 times that of Comparative Example 5.

EXAMPLE 11

A rubber roll was prepared in the same manner as in Example 1, except for the proportion by weight of silicone rubber/NBR set to 60/40.

The rubber roll of Example 11 presented durability with respect to ultraviolet-curing ink substantially equal to that of Example 10.

What is claimed is:

1. A printing blanket comprising:

a supporting layer, and an ink receptive surface printing layer comprising rubber, wherein said rubber consists essentially of a mixture of:

silicone rubber; and an acrylonitrile-butadiene oil-resisting rubber, in a proportion by weight of 2/98 to 80/20, respectively, on at least one surface of said supporting layer.

2. An ink receptive printing roll comprising rubber, wherein said rubber consists essentially of a mixture of:

silicone rubber, and acrylonitrile-butadiene oil-resisting rubber, in a proportion by weight of 2/98 to 80/20, respectively.

3. A printing rubber roll according to claim 2, wherein the proportion by weight of silicone rubber/oil-resisting rubber is in a range from 20/80 to 60/40.

* * * * *